(12) United States Patent
Penney (10) Patent No.: US 7,634,438 B2
(45) Date of Patent: Dec. 15, 2009

(54) DYNAMIC ACCOUNT MAPPING SYSTEM FOR COMPUTERIZED ASSET TRADING

(75) Inventor: Neill Penney, Surrey (GB)

(73) Assignee: FX Alliance, LLC, New York, NY (US)

(*) Notice: Subject to any disclaimer, the term of this patent is extended or adjusted under 35 U.S.C. 154(b) by 486 days.

(21) Appl. No.: 11/316,385

(22) Filed: Dec. 23, 2005

(65) Prior Publication Data

US 2006/0161497 A1    Jul. 20, 2006

Related U.S. Application Data

(60) Provisional application No. 60/638,115, filed on Dec. 23, 2004.

(51) Int. Cl.
*G06Q 40/00* (2006.01)
(52) U.S. Cl. .............. 705/36 R; 705/35; 705/36 T; 705/37; 705/39; 707/202; 707/3; 340/5.86
(58) Field of Classification Search ............... 705/36 R
See application file for complete search history.

(56) References Cited

U.S. PATENT DOCUMENTS

| | | | |
|---|---|---|---|
| 4,677,552 A | 6/1987 | Sibley, Jr. | |
| 4,750,135 A | 6/1988 | Boilen | |
| 4,903,201 A | 2/1990 | Wagner | |
| 5,077,665 A | 12/1991 | Silverman et al. | |
| 5,136,501 A | 8/1992 | Silverman et al. | |
| 5,258,908 A | 11/1993 | Hartheimer et al. | |
| 5,262,942 A | 11/1993 | Earle | |
| 5,375,055 A | 12/1994 | Togher et al. | |
| 5,758,328 A | 5/1998 | Giovannoli | |
| 5,761,386 A | 6/1998 | Lawrence et al. | |
| 5,787,402 A | 7/1998 | Potter et al. | |
| 5,794,234 A | 8/1998 | Church et al. | |
| 5,819,237 A | 10/1998 | Garman | |
| 5,855,008 A | 12/1998 | Goldhaber et al. | |

(Continued)

OTHER PUBLICATIONS

Addison, E.R., "Using news understandings and neural networks in foreign currency options trading," available at http://ieeexplore.ieee.org/search97/s97is.vts? cti n= iew& dk gwKey= http%3A%2 % 2 j . . . (Aug. 27, 2001) Abstract.

(Continued)

*Primary Examiner*—Kirsten S Apple
(74) *Attorney, Agent, or Firm*—Grady L. White, Esq.; Law Offices of Grady L. White, LLC (57) ABSTRACT

Methods and apparatuses for processing orders in a computerized asset trading system when the order contains trading requirements for trading accounts that do not map to trading accounts recognized by the provider trading system. The invention books trading requirements associated with the unrecognized trading accounts against a default trading account set up for the customer by the provider, thereby allowing the order to be processed instead of rejected merely because one or more of the customer-specified trading accounts has not yet been approved by the provider. The invention also allows providers to specifically block customer trading accounts, and to dynamically create approved trading accounts as they are needed so that subsequent transactions involving the previously unapproved trading accounts will be executed without using the default trading account. The invention also rejects orders for customer trading accounts that have been specifically blocked by the provider.

31 Claims, 3 Drawing Sheets

U.S. PATENT DOCUMENTS

| | | | |
|---|---|---|---|
| 5,890,140 | A | 3/1999 | Clark et al. |
| 5,897,621 | A | 4/1999 | Boesch et al. |
| 5,924,082 | A | 7/1999 | Silverman et al. |
| 5,924,083 | A | 7/1999 | Silverman et al. |
| 5,963,923 | A | 10/1999 | Garber |
| 5,978,485 | A | 11/1999 | Rosen |
| 6,014,627 | A | 1/2000 | Togher et al. |
| 6,016,483 | A | 1/2000 | Richard et al. |
| 6,029,146 | A | 2/2000 | Hawkins et al. |
| 6,058,378 | A | 5/2000 | Clark et al. |
| 6,088,685 | A | 7/2000 | Kiron |
| 6,098,051 | A | 8/2000 | Lupien et al. |
| 6,134,535 | A | 10/2000 | Belzberg |
| 6,141,653 | A | 10/2000 | Conklin et al. |
| 6,205,433 | B1 | 3/2001 | Boesch et al. |
| 6,247,000 | B1 | 6/2001 | Hawkins et al. |
| 6,260,025 | B1 | 7/2001 | Silverman et al. |
| 6,278,982 | B1 | 8/2001 | Korhammer et al. |
| 6,304,858 | B1 | 10/2001 | Mosler et al. |
| 6,421,653 | B1 | 7/2002 | May |
| 6,560,580 | B1 | 5/2003 | Fraser et al. |
| 6,629,081 | B1 | 9/2003 | Cornelius et al. |
| 6,766,304 | B2 | 1/2004 | Kemp, II et al. |
| 6,772,132 | B1 | 8/2004 | Kemp, II et al. |
| 6,792,411 | B1 * | 9/2004 | Massey, Jr. .................. 705/35 |
| 6,807,635 | B1 | 10/2004 | Kleckner |
| 7,184,984 | B2 | 2/2007 | Glodjo |
| 7,433,842 | B2 * | 10/2008 | Toffey ......................... 705/37 |
| 2001/0034631 | A1 | 10/2001 | Kiselik |
| 2001/0044771 | A1 | 11/2001 | Usher |
| 2003/0050888 | A1 | 3/2003 | Satow et al. |
| 2003/0069836 | A1 | 4/2003 | Penney |
| 2003/0139997 | A1 | 7/2003 | Ginsberg |
| 2003/0149653 | A1 | 8/2003 | Penney |
| 2004/0039689 | A1 | 2/2004 | Penney |
| 2004/0078317 | A1 | 4/2004 | Allen |
| 2004/0138907 | A1 * | 7/2004 | Peters et al. .................... 705/1 |
| 2004/0143539 | A1 | 7/2004 | Penney |
| 2005/0114257 | A1 | 5/2005 | Penney |
| 2005/0114258 | A1 | 5/2005 | Penney |

OTHER PUBLICATIONS

Enhanced Market Access: Evolving the Wheel, http://www.currency.com/misc./wp-ema.pdf (Aug. 11, 2003).

Galileo International Introduces New Viewpoint (TM) Software, PR Newswire, p. 01651 (3 pages) (Nov. 9, 1999).

Going with the flow, banking technology online, available at http://www.bankingtech.com/online/features/2001/m y.html (Aug. 28, 2001).

Gresh, D.L. et al., "An interactive framework for visualizing foreign currency exchange options," available at http:// ieeexplore.ieee.org/search97/s97is.vts? cti n= iew& dk gwKey=http%3A%2 %2 j . . . (Aug. 27, 2001).

Instant Web Trading available at http://www.cognotec.com/service/index.html (Aug. 11, 2003).

Izumi, K. et al., "An artificial market analysis of exchange rate dynamics," Evolutionary Programming V. Proceedings of the Fifth Annual Conference on Evolutionary Programming, p. 27-36 (1996) (Abstract).

Kaizoji, Taisei, "A Synergetic Approach to Speculative Price Volatility," SAC '99, p. 57-65 (1998).

Kim, Lau Sim, "Towards an intelligent Boss," Proceedings of the First Singapore International Conference on Intelligent Systems (SPICIS '92), p. 313-17 (1992) (Abstract).

Klopfenstein, G., "A random walk in chaos," Banking Technology, 10(5): 26-8, (Jun. 1993) (Abstract).

O'Callaghan, D., "Straight Through to the Portal [foreign exchange trading]," Banking Technology, 18(4): 36-40 (May 2001), Abstract.

Parikh, Satu S. et al., "Electronic futures markets versus floor trading: Implications for interface design," available at http://www.com.rg/pubs/articles/proceedings/chi/223904/p296-parikh.html (Aug. 27, 2001).

Prasolov, A.V. et al., "On forecast of exchange rate of a foreign currency," available at http://ieeexplore.ieee.org/search97/s97is.vts?.

Reuters: Products & Services, Sales & Trading—Treasury available at http://about.reuters.com/productinfo/treasury.asp?seg=1 (Aug. 11, 2003).

Riggs gets the personal touch [bank business operations], Financial Technology Bulletin, 19(3): 4 (Jun. 14, 2001) (Abstract).

Simms, M., "Portfolio vendors promote STP with increasingly open product offerings," Wall Street & Technology suppl. issue, p. 18, 20, 22, 24-5 (Feb. 2001) (Abstract).

www.fxgame.com, FXGame—Currency Trading Game, available at http://fxgame.oanda.com (Aug. 27, 2001).

Cross, S., "All About the Foreign Exchange Market in the United States," published by the Fed. Reserve Bank of New York, 1998, Chaps. 7-8.

* cited by examiner

TRADING > ACCOUNT AND USER MAPPING

CUSTOMER SEARCH: [ACMECORP]

CUSTOMER TRADING ACCOUNTS > ACMECORP

APPROVE ALL    BLOCK ALL    RESET ALL

| CUSTOMER ACCOUNTS | PROVIDER ACCOUNTS | APPROVAL STATUS |
|---|---|---|
| FUND01 | ACMEF001 | APPROVED ▶ |
| FUND02 | ACMEF002 | APPROVED ▶ |
| FUND03 | ACMEF003 | APPROVED ▶ |
| FUND04 |  | BLOCKED ▶ |
| FUND05 | ACMEF005 | PENDING ▶ |

DEFAULT TRADING ACCOUNT: [ACMEFXXX]    ACTIVATION STATUS: [ACTIVATED ▶]

FIG. 3

DYNAMIC ACCOUNT MAPPING SYSTEM FOR COMPUTERIZED ASSET TRADING

CROSS-REFERENCE TO RELATED APPLICATIONS

This application is related to and claims priority under 35 U.S.C. § 119 to provisional patent application No. 60/638,115, filed on Dec. 23, 2004, which is incorporated into this application in its entirety by this reference.

FIELD OF ART

The present invention relates generally to computerized asset trading systems and more particularly to computerized asset trading systems that allow users to execute orders against default trading accounts when the trading account specified by the customer has not previously been entered into the computerized asset trading system as an approved trading account.

RELATED ART

In the asset trading business, including for example the foreign exchange ("FX") and money markets, customers execute trades through asset dealers (typically, banks or banking institutions), who are referred to as "liquidity providers," or simply "providers." In a typical scenario, a customer wishing to buy, sell, lend or borrow some quantity of assets proposes a trading transaction by sending a request for price quotes (referred to as an "RFQ") to one or more of the providers. The providers respond by returning price quotes for the proposed transaction, which indicate the prices the providers are willing to buy (or borrow) the assets, the prices they are willing to sell (or lend) the assets, as well as the size of the order the provider is willing to deal at the quoted prices. If a customer likes a price quote and wishes to enter into a deal with the sending provider, then the customer transmits to the provider an offer to trade assets for the price stated in the price quote (the offer is typically referred to as an "offer to deal"). If the price quote is still available (i.e., not expired) when the provider receives the customer's offer to deal, and the provider can meet other terms in the RFQ and offer to deal, such as the quantity ordered and the proposed settlement date, then the provider typically accepts the offer to deal, and the proposed transaction becomes an order, which is booked and executed.

Computer-automated asset trading systems have been introduced to facilitate faster, more efficient and, for auditing purposes, more traceable, trading transactions between customers and providers. Typically, these systems comprise a high-level trading application program (or, in some instances, a suite of high-level trading application programs) or a graphical user interface running on a customer's computer system (or network), which receives input from the user and sends electronic trading instructions to one or more high-level trading application programs running on the providers' computer systems (or networks). The customer's computer system and the providers' computer systems talk to each other by exchanging a series of messages via one or more data communication channels established within an interconnected computer network, such as the Internet, a dedicated wide area network (WAN), a virtual private network ("VPN") or a corporate intranet. Typically, the high-level trading application programs and graphical user interfaces create messages and transmit them over the computer network by accessing a predefined collection or library of subroutines and function calls. The collection or library of subroutines and function calls is referred to as an application programming interface ("API").

With the help of the APIs, the messages carrying orders over the data communications links in the computer network may be channeled through an intermediate or centralized online trading server (or "portal"), which is also connected to the interconnected computer network. Typically, the intermediate online trading server is configured to coordinate, compare, match, error-check and/or log the orders on behalf of the customers and liquidity providers and communicate responses and order statuses to the parties in real-time. In some cases, the online trading server is managed and operated by a third party. FX Alliance, LLC of New York, N.Y. (FXall) is one example of a third party operator of an online trading server for the FX market. Usually, the intermediate or centralized online trading server includes a customer interface, which communicates via the interconnected computer network with an API running on the customer's trading system, and a provider interface, which communicates via the interconnected computer network with another API running on the provider's trading system.

Customers often use a multitude of trading accounts to engage in trading transactions with a multitude of providers. For example, a customer trader may place a single order to be executed against three different trading accounts, which that customer refers to internally as FUND01, FUND02 FUND03, and so on. The customer's computerized asset trading system will be programmed to use and recognize trading accounts having the names or identifiers FUND01, FUND02 and FUND03. A problem arises, however, because there is no standard naming convention for trading accounts. Consequently, the provider counterparties for these trades may choose, and most often do chose, to use different names and identifiers for the trading accounts associated with that customer.

For example, if the customer is the ACME Corporation, then one provider's computerized asset trading system may be programmed to recognize and use trading account names that are more meaningful from the provider's perspective, such as ACMEFF001, ACMEFF002, ACMEFF003, and so on, whenever it sends trading instructions to or receives trading instructions from the ACME Corporation. Another provider engaged in trading assets with ACME Corporation may use a completely different set of account names for ACME Corporation's trading accounts, such as S12345A, S12345B and S12345C. Thus, although all of the terms refer to the same physical trading accounts, the terms FUND01, FUND02 and FUND03 will have no meaning on the providers trading systems, and the terms ACMEF001, ACMEF002, ACMEF003, S12345A, S12345B and S12345C will have no meaning on the customer's trading system.

Conventional computerized asset trading systems have attempted to address this problem by allowing the provider to set up mapping tables (i.e., mapping databases) on the intermediate online trading server, which correlate, or "map," the provider's trading accounts, on a one-to-one basis, to a set of provider-approved customer trading accounts. Using this mapping table or database, the trading server can then reconcile the trading account names used by the customer's trading systems with those names used by the providers' trading systems. Thereafter, as long as the customer trading system uses a trading account name contained in the provider's account mapping database, the intermediate online trading server can match the customer-specified trading accounts to the provider's list of approved customer trading accounts and execute the order. More particularly, the intermediate online trading server can book transactions requested by the customer trading system against the correct trading accounts, and execute deals without the customer and provider trading systems knowing, using or recognizing each other's trading account names.

Nevertheless, there are still significant problems associated with using mapping tables and mapping databases to resolve trading account names. For example, if the counterparties have agreed, perhaps by letter or telephone, that a customer can trade using a certain trading account name, and the provider has, for one reason or another, neglected to enter the new trading account name into the provider's mapping database, then orders placed by the customer which are associated with the new trading account will be rejected by the intermediate trading server. Such rejections can result in a very significant loss of business for customers and providers. It is not uncommon, for instance, for a customer who is a large fund manager for a large number of clients to engage in a large number of trades using fifty, one hundred, or more separate trading accounts. Moreover, a single provider may have hundreds or thousands of counterparty customers.

Under these circumstances, the conventional systems require hundreds, or sometimes thousands, of different mapping table entries in order to account for all of the trading accounts used by all of his customers. This requirement generates a substantial amount of work for providers, much of this work comprising manual data entry, which can lead to a significant number of keying and typographical errors in the mapping tables. With so many mapping table entries to create and manage, providers frequently fall behind in keeping their mapping tables for all of their customers error-free and completely up-to-date.

Accordingly, there is considerable need for computerized asset trading systems and methods of executing orders that give customers and providers the ability to execute orders even though the orders contain trading requirements associated with trading accounts that have not been entered into the mapping table or mapping database. There is also a need for such systems and methods to allow providers to dynamically update the mapping databases so that the previously unrecognized customer trading accounts will be recognized in subsequent transactions.

SUMMARY OF THE INVENTION

The present invention addresses the above-described needs, as well as other needs and issues hereinafter described, by providing a computer system (such as an online trading server) for trading assets that will execute orders against default trading accounts if the customer-specified trading accounts are not recognized. The computer system comprises a customer interface, an account mapping database, an account manager and a trading engine. The customer interface receives an order from a customer trading system, the order comprising a trading requirement for an approved customer trading account and a trading requirement for an unapproved customer trading account. The account mapping database determines whether there is a first correlation between the approved customer trading account and an approved provider trading account, as well as whether there is a second correlation between the unapproved customer trading account and a default provider trading account previously set up by the provider. The account manager, typically acting in concert with the account mapping database, is configured to supply the trading engine with a confirmation of whether the first and second correlations are contained in the account mapping database. If the confirmation is provided, then the trading engine will execute the order, booking the requirements for the approved customer account against the approved provider trading account, and booking the requirements for the unapproved customer account against the default provider account. However, if the account manager does not provide the confirmation, then the trading engine will reject the order.

In some instances, the order received by the customer interface only contains trading requirements for unapproved customer accounts. In these instances, the account manager, account mapping database and trading engine cooperate to execute the entire order against the default provider trading account. Thus, the invention also provides benefits and advantages over the conventional computerized asset trading systems in cases where the order does not contain trading requirements for provider-approved customer trading accounts. In this aspect of the invention, the trading engine executes the order after the unapproved trading accounts are correlated (i.e., mapped) to the default provider trading account and does not require mapping or confirmation of any approved customer accounts. This aspect of the invention comprises a customer interface which receives an order from a customer trading system, the order comprising a trading requirement for an unapproved customer trading account; an account mapping database which determines whether there is a correlation between the unapproved customer trading account and a default provider trading account; an account manager which supplies a confirmation for the correlation; and a trading engine, coupled to the account manager, which executes the order responsive to the confirmation.

Preferred embodiments of the invention also determine whether one or more of the unapproved customer trading accounts in an order has been specifically blocked by a provider specified in the order. If this is the case, then the account manager will provide a notice of the blocked status to the trading engine, which will reject the entire order responsive to the notice.

Yet another aspect of the invention provides a computer-implemented method for processing orders in a computerized asset trading system. The method includes the steps of (1) providing a customer interface for communication with a customer trading system; (2) providing a provider interface for communication with a provider trading system; (3) receiving an order from the customer trading system via the customer interface, the order comprising a first trading requirement for an approved customer trading account and a second trading requirement for an unapproved customer trading account; (4) providing an account mapping subsystem (comprising, for example, an account manager and an account mapping database) which establishes a first correlation between the approved customer trading account and an approved provider trading account, and a second correlation between the unapproved customer trading account and a default provider trading account; and (5) providing a trading engine which executes the order responsive to the establishment (i.e., confirmation) of the first and the second correlations.

Still another aspect of the invention comprises the steps of: (1) defining a set of provider-approved customer trading accounts for a provider trading system; (2) defining a default customer trading account for the provider trading system; (3) receiving an order from a customer trading system, the order comprising a trading requirement for a customer-specified trading account; (4) determining whether there is a correlation between the customer-specified trading account and a provider-approved customer trading account in the set; (5) booking the trading requirement against the provider-approved customer trading account if the correlation exists; and (6) booking the trading requirement against the default customer trading account if the correlation does not exist.

In preferred embodiments of the invention, the account manager may be accessed by a human operator to define new approved accounts corresponding to the previously unapproved customer trading accounts that were executed against the default provider trading account. So, for example, if the provider learns (by accessing the account manager, for instance), that certain orders and requirements were booked against the default provider trading account by the trading engine, and that those orders and requirements were associated with an unapproved customer trading account that the customer identified as "FUND42," then the provider can operate the account manager to set up a new approved trading account, called "ACMEF042," for instance, which will now be used for all subsequent orders containing trading requirements for customer trading account FUND42. In other words, FUND42 has now been converted from an unapproved customer trading account into an approved customer trading account. Thereafter, there will be no need for the trading engine to use the default provider trading account for transactions involving customer trading account FUND42.

If an order contains trading requirements for an unapproved trading account and the provider has not established a default provider trading account for that customer, then the entire order will be rejected by the trading engine. Similarly, the entire order will be rejected if the order contains trading requirements associated with a provider trading account that has been specifically blocked by the provider.

BRIEF DESCRIPTION OF THE DRAWINGS

The present invention and various aspects, features and advantages thereof are explained in detail below with reference to exemplary and therefore non-limiting embodiments and with the aid of the drawings, which constitute a part of this specification and include depictions of the exemplary embodiments. In these drawings.

DETAILED DESCRIPTION OF PREFERRED EMBODIMENTS

With reference to the figures, a detailed discussion of exemplary embodiments of the invention will now be presented. Notably, the invention may be implemented using software, hardware, firmware, or any combination thereof, as would be apparent to those of skill in the art upon reading this disclosure.

Figure 1:
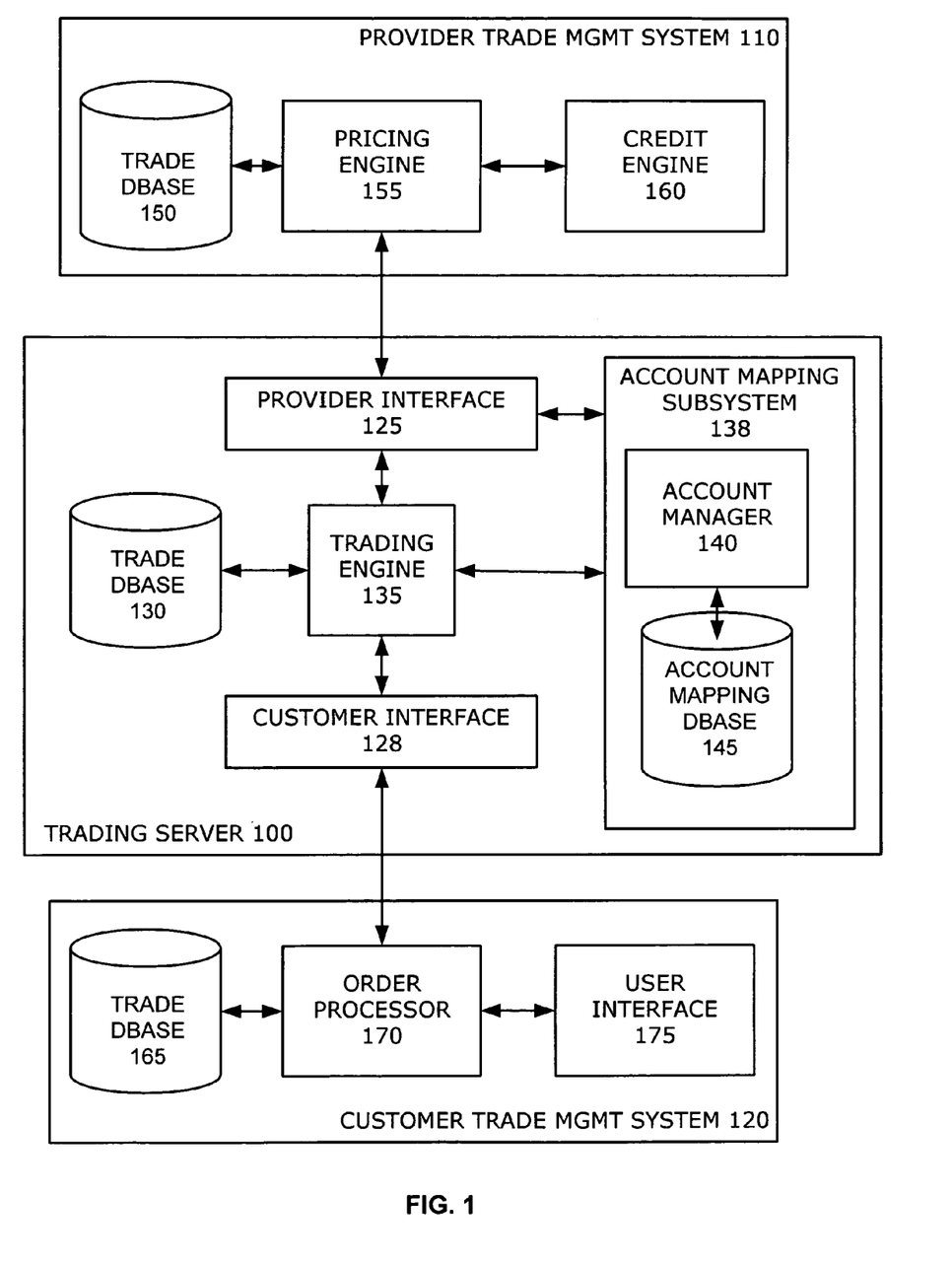
FIG. 1 contains a high-level block diagram illustrating the major functional components of a trading server configured to operate according to an embodiment of the invention.

FIG. 1 contains a high-level block diagram illustrating the major functional components of a trading server configured to operate according to an embodiment of the invention. Trading server 100 comprises provider interface 125, customer interface 128, trading engine 135, trade database 130 and account mapping subsystem 138. Provider interface 125 and customer interface 128 will typically include the computer hardware, firmware and software programs often used in the computer networking business for providing network communications between remotely linked computer systems. In FIG. 1, for example, provider trade management system 110 and customer trade management system 120 are linked to trading server 100 via provider interface 125 and customer interface 128, respectively. These provider and customer interfaces on trading server 100 might include, for example, network adapter cards, wired and wireless network communication links, cables, routing, switching receiving devices, was well as the software drivers and application programming interfaces (APIs) frequently used to implement such networks.

A customer uses customer trade management system 120 to generate orders containing trading requirements. As shown in FIG. 1, customer trade management system 120 typically includes a user interface 175, operatively connected to an order processor 170, which is in turn coupled to a trade database 165. Order processor 170 generates orders containing trading requirements for customer trading accounts (some of which are approved and some of which are unapproved from the perspective of trading server 100 and provider trade management system 110). Customer trade management system 120 also includes a trade database 165, where order processor 170 stores details about the orders it sends to trading server 100.

Customer interface 128 receives orders from order processor 170 on customer trade management system 120 and passes the orders to trading engine 135 for processing and/or execution. Trading engine 135 executes the orders if it can match the trading accounts specified in the order with provider-approved trading accounts or a default provider trading account, as defined by account mapping subsystem 138. But if account mapping subsystem 138 does not contain correlations for the unapproved customer trading accounts in the order, and also does not contain a default provider trading account, then trading engine 135 will reject the order. Whether an order is executed or rejected, preferred embodiments of the invention will typically store details concerning the status of orders in a trade transaction database, represented in FIG. 1 as trade database 130.

In the embodiment shown in FIG. 1, account mapping subsystem 138 comprises an account manager 140, which is coupled to account mapping database 145. Account mapping database 145 can be implemented using a variety of well-known data repository schemes, such as relational or hierarchal database files, spreadsheets, tables, flat files, etc. Account manager 140 may be implemented in hardware, firmware or software, as an interactive or non-interactive process or tool, which operates in conjunction with, or independently from a database management system. In preferred embodiments, however, account manager 140 comprises a set of graphically illustrated forms containing data input fields the provider user can populate and change (as described below with reference to FIG. 3) in order to define approved, blocked and default trading accounts for any customer. The data input fields on the forms show the trading account names and their correlations as stored in account mapping database 145.

FIG. 1 also shows an optional provider interface 125, which facilitates communication over an interconnected computer network (not shown in FIG. 1) with provider trade management system 110. In preferred embodiments, provider interface 125 carries trading orders, prices and other trading messages back and forth between provider trade management system 110 and trading engine 135. Provider interface 125 also supports access to account manager 140 by provider trade management system 110's operator to define, change or modify the default provider trading account or the list of approved customer trading accounts.

As shown in FIG. 1, provider trading systems generally comprise a pricing engine 155, which supplies prices for the orders, a credit engine 160, which tracks the credit status of the provider's customers in relation to pending and executed orders, and a trade database 150, which, like trade database 165 on the customer trading system, stores details about pending and executed trades.

Figure 2:
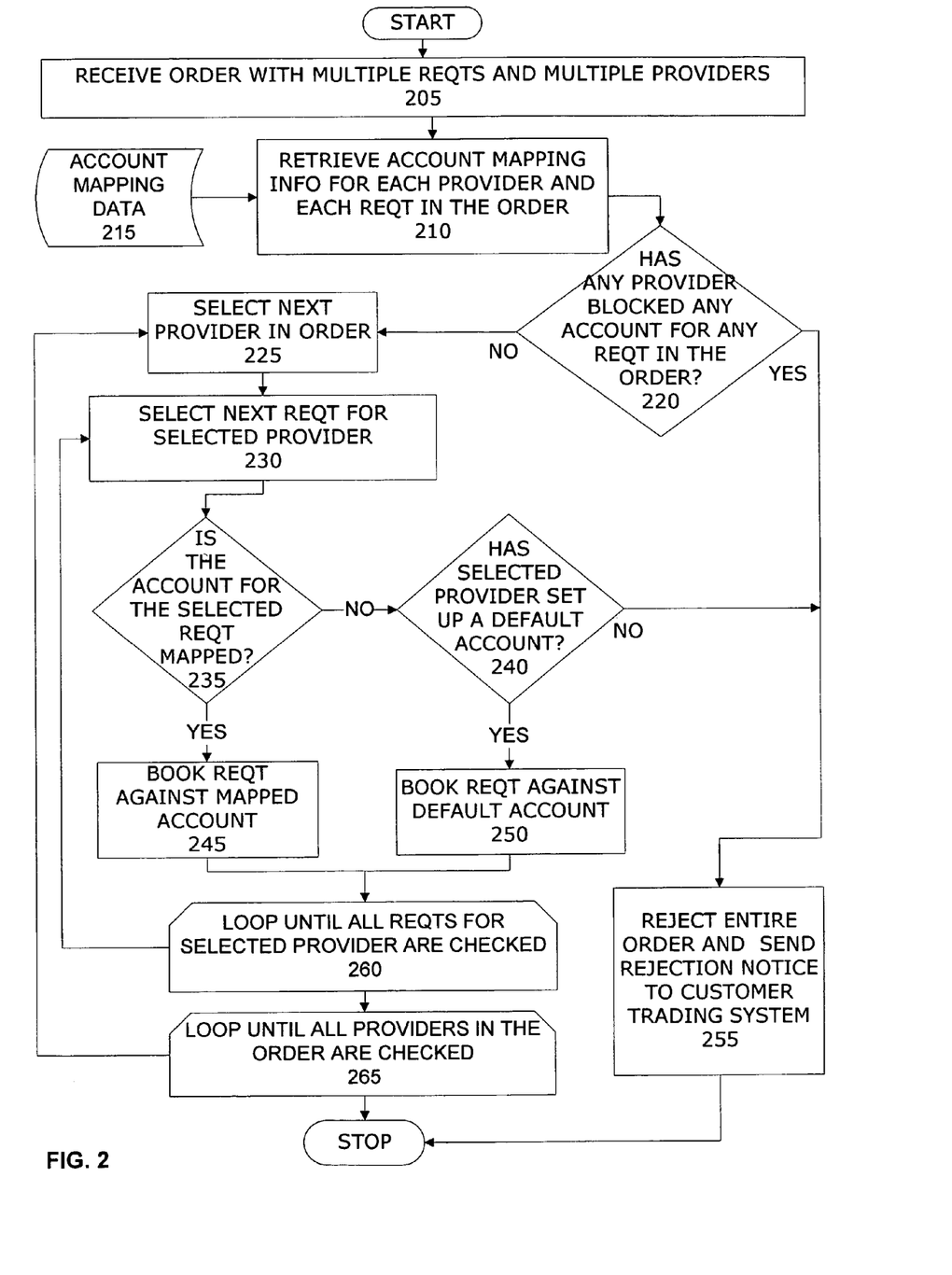
FIG. 2 contains a high-level flow diagram illustrating the steps that might be performed by a trading server, such as the trading server shown in FIG. 1, configured to operate according to an embodiment of the invention.

FIG. 2 contains a high-level flow diagram illustrating the steps that may be performed by a computerized asset trading system, such as trading server 100 in FIG. 1, configured to operate according to embodiments of the present invention. In particular, the flow diagram in FIG. 2 illustrates, by way of example only, steps the trading server may perform to process an order containing multiple trading requirements, where some of the trading requirements are associated with customer trading accounts that have been approved by the provider and some of the trading requirements are associated with customer trading accounts that have not been approved by the provider. Customers can typically achieve better prices and pay fewer transaction fees and commissions by executing a plurality of trading requirements substantially simultaneously in a single large order, as opposed to executing multiple separately priced orders, each one containing a single trading requirement. Orders containing multiple trade requirements for multiple trading accounts are sometimes referred to as "batch orders" or a "batch of trades." Although the example that follows applies to a batch order, it will be apparent to those skilled in the art upon reading this disclosure that the invention also finds practical application and significant benefits when used to process orders containing a single trading requirement for a single trading account.

First, at step 205, the system receives from a customer trading system a batch order referring to multiple trading requirements and multiple providers. Typically, although not necessarily, the multiple trading requirements contained in a batch order will be associated with a multiplicity of customer trading accounts. Next, at step 210, the system retrieves account mapping data 215 from the account mapping database. Account mapping data 215 includes data concerning correlations (i.e., mappings) between approved customer trading accounts and provider trading accounts, as well as identifiers for the providers' default trading accounts for the customer. In preferred embodiments, account mapping data 215 also contains data indicating which customer trading accounts, if any, have been blocked or deactivated by the provider.

The system next determines, at step 220, whether any provider has blocked any of the trading accounts for any of the trading requirements in the order. Being able to block specific customer trading accounts gives providers who generally do not have a problem assigning trades to a default trading account a way to temporarily or permanently configure the system to reject trades for certain customer accounts without disabling default account mapping for other trading accounts. A provider may block and account, for example, when it is determined that a particular customer has exceeded a credit limit or authorization level for that account. This functionality gives providers an extra level of control over the automatic default mapping and trading process.

If the trading account in the order has is blocked, then the system rejects the entire order and sends a rejection notice to the customer trading system. See step 255. If, on the other hand, it is determined at step 220 that no provider has blocked any of the trading accounts for any of the trading requirements in the order, then processing continues at steps 225 and 230, where the system selects the first provider in the order and the first requirement for that provider. As will be described below, preferred embodiments of the invention are configured to process all of the requirements in the order that are associated with a selected provider, one at a time, until all of the requirements for that provider are processed, and then proceed to the next provider and process all of the requirements in the order for that next provider. It is noted, however, that the invention can also be configured to process all of the requirements in the order, one at a time, without regard to the particular provider.

Next, at step 235, the system determines (by reviewing the previously retrieved account mapping data 15, for example) whether the selected requirement's customer-specified trading account is mapped or in some other way correlated to an approved provider trading account that is not blocked. If the answer is yes, then the system books the selected trading requirement against the provider trading account which is mapped to the customer-specified trading account (step 245).

Continuing with the previous example involving ACME Corporation, assume that ACME Corporation has established a set of trading accounts it refers to internally as FUND01, FUND02 and FUND03. Assume further that Provider No. 1 has created a set of trading accounts for ACME Corporation which correspond to FUND01, FUND02 and FUND03. But Provider No. 1 refers to these corresponding trading accounts as ACMEF001, ACMEF002 and ACMEF003. Provider No. 1 has also created a default trading account for ACME Corporation, which Provider No. 1 refers to internally as ACMEFXXX. Meanwhile, another provider, say Provider No. 2, has created a different set of trading accounts for ACME Corporation, which also correspond to FUND01, FUND02 and FUND03, but which Provider No. 2 refers to as S12345-001, S12345-002 and S12345-003. Provider No. 2, however, has not created a default trading account for ACME Corporation. In preferred embodiments of the invention, all of this information, including the customer's trading account names, the providers' trading account names, the mappings between the customer's trading account names and the providers' trading account names, as well as the default and blocked account names, if any, are stored in the account mapping database and accessed through the account manager program or user interface.

Based on this set of facts, step 235 of FIG. 2 would determine that the customer-specified trading account, FUND01, has been mapped to Provider No., 1's trading account ACMEF001. Therefore, execution of step 240 in FIG. 2 would comprise booking the FUND01 trading requirement against the Provider No. 1's trading account ACMEF001. On the other hand, if it is determined at step 235 that the selected trading account is unmapped, then processing continues at step 240, where the system determines whether the provider has set up a default trading account for the customer. If no default account has been set up, then, once again, processing jumps to step 255, where the system rejects the entire order and sends a rejection notice to the customer trading system. But if the provider has set up a default trading account, then the system books the trading requirement against the default trading account (step 250).

As shown in FIG. 2, the next step (step 260) is to loop back to step 230 to select the next requirement for the selected provider. But if there are no more requirements for the selected provider, then the next step (step 265) is to loop back to step 225 to select the next provider in the order. If there are no more requirements and no more providers to select, then the entire order has been booked and processing comes to an end.

Figure 3:
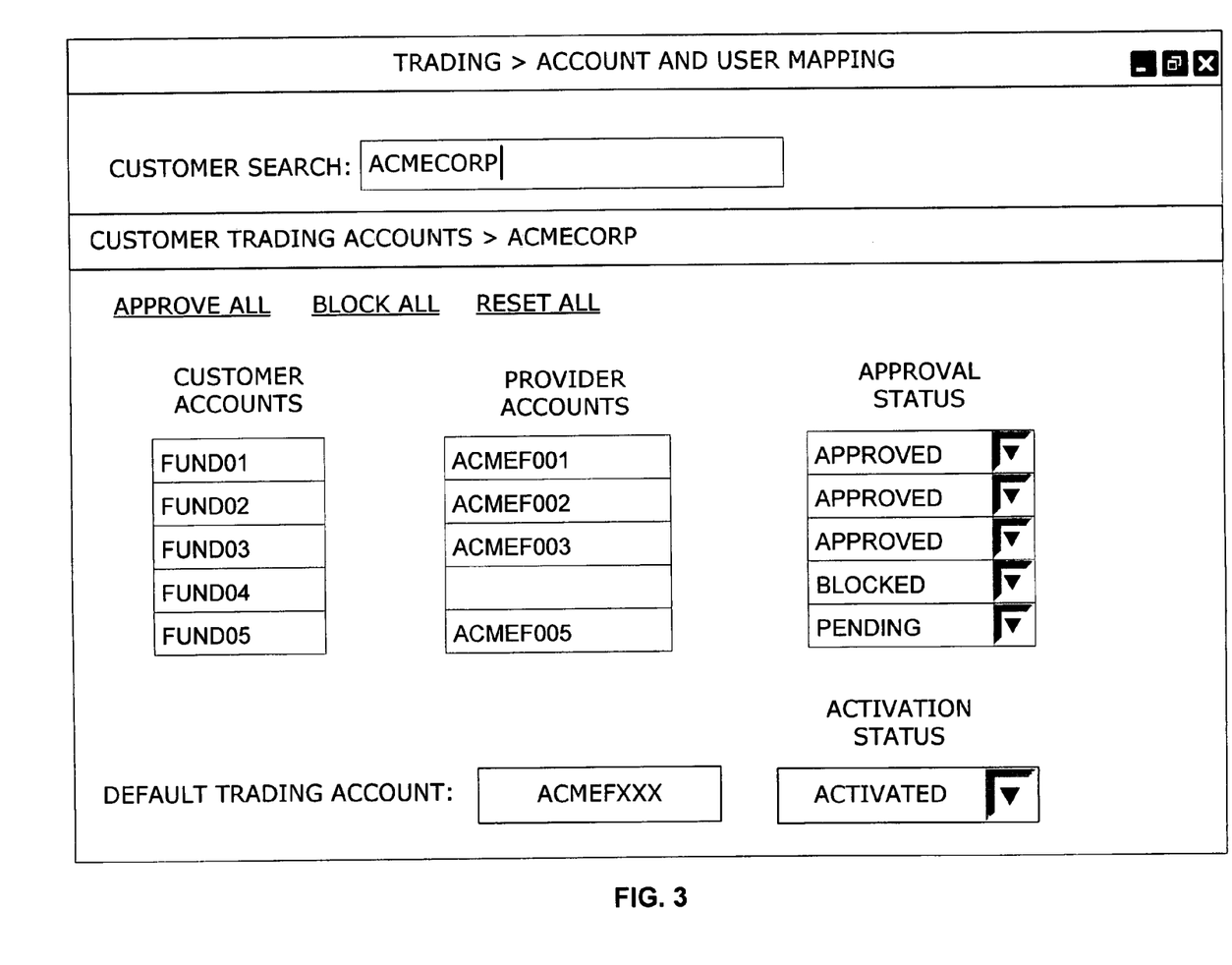
FIG. 3 contains an exemplary user interface screen that might be used in embodiments of the invention to manage and map approved customer trading accounts, to block customer trading accounts, and to define default trading accounts for a customer.

FIG. 3 contains an exemplary screenshot of a user interface screen for an account manager configured to operate according to the principles of the invention. In large part, FIG. 3 illustrates how the user interface screen might appear when Provider No. 1 in our previously-described example sets up trading account mappings and a default trading account for the ACME Corporation. As shown in FIG. 3, there is provided a first column (labeled "CUSTOMER ACCOUNTS" in FIG. 3) which contains the names of the trading accounts used by the ACME Corporation for trading assets with Provider No. 1. The second column (labeled "PROVIDER ACCOUNTS" in FIG. 3) contains the names of the provider trading accounts that are mapped to the customer's trading accounts. The third column (labeled "APPROVAL STATUS") shows whether the correlation between the customer trading account is approved, blocked, or pending. In preferred embodiments the provider can supply or modify the information contained in these columns in order to create the desired account correlations between provider trading accounts and customer trading accounts, as well as to block certain customer accounts.

At the bottom of FIG. 3, there are fields the provider may use to designate a default trading account for transactions involving the ACME Corporation. The first field is configured to receive the name of the default trading account and the second field is used to set the activation status for the named default account. In this case, the provider has specified and activated the account called "ACMEFXXX" as the default trading account. Therefore, whenever ACME Corporation sends an order to the trading server containing trading requirements associated with a customer-specified trading account that is not already contained in the mapping table, then the trading server will book those requirements against the default trading account ACMEFXXX.

The present invention has been disclosed and described herein in what is considered to be its most preferred embodiments. It should be noted that variations and equivalents may occur to those skilled in the art upon reading the present disclosure and that such variations and equivalents are intended to come within the scope of the invention and the appended claims.

What is claimed is:

1. A computer system for trading assets, comprising:
   a customer interface which receives an order from a customer trading system, said order comprising a trading requirement for an approved customer trading account and a trading requirement for an unapproved customer trading account;
   an account mapping database which determines whether there is a first correlation between said approved customer trading account and an approved provider trading account, and whether there is a second correlation between said unapproved customer trading account and a default provider trading account;
   an account manager which is configured to supply a confirmation of said first and second correlations; and
   a trading engine, coupled to said account manager, which executes said order responsive to said confirmation.

2. The computer system of claim 1, wherein said trading engine executes said order against said default provider trading account.

3. The computer system of claim 1, wherein said trading engine will reject said order if said account manager does not supply said confirmation.

4. The computer system of claim 1, wherein said account mapping database is further configured to determine whether said unapproved customer trading account is blocked.

5. The computer system of claim 4, wherein:
   said account manager is further configured to supply a notice if said unapproved customer trading account is blocked; and
   said trading engine will reject said order responsive to said notice.

6. The computer system of claim 1, further comprising:
   a trading database;
   wherein said trading engine stores a detail concerning said executed order in said trading database.

7. The computer system of claim 1, further comprising a provider interface for communication with a provider trading system.

8. The computer system of claim 7, wherein said account manager may be manipulated by a human operator, via said provider interface, to create a new approved provider trading account corresponding to said unapproved customer trading account.

9. The computer system of claim 7, wherein said trading engine is further configured to transmit a detail concerning said executed order to said provider trading system via said provider interface.

10. A computer system for trading assets, comprising:
    a customer interface which receives an order from a customer trading system, said order comprising a trading requirement for an unapproved customer trading account;
    an account mapping database which determines whether there is a correlation between said unapproved customer trading account and a default provider trading account;
    an account manager which is configured to supply a confirmation for said correlation; and
    a trading engine, coupled to said account manager, which executes said order responsive to said confirmation.

11. The computer system of claim 10, wherein said trading engine will reject said order if said account manager does not supply said confirmation.

12. The computer system of claim 10, wherein said trading engine is configured to execute said order against said default provider trading account.

13. The computer system of claim 10, wherein said account mapping database is further configured to determine whether said unapproved customer trading account is blocked.

14. The computer system of claim 13, wherein:
    said account manager is further configured to supply a notice if said unapproved customer trading account is blocked; and
    said trading engine will reject said order responsive to said notice.

15. The computer system of claim 10, further comprising a provider interface for communication with a provider trading system.

16. The computer system of claim 15, wherein said account manager may be manipulated by a human operator, via said provider interface, to create a new approved provider trading account corresponding to said unapproved customer trading account.

17. The computer system of claim 15, wherein said trading engine is further configured to transmit a detail concerning said executed order to said provider trading system via said provider interface.

18. A computer system for trading assets, comprising:
an account mapping database which stores a set of provider-approved customer trading accounts and a default customer trading account;
a customer interface which receives an order from a customer trading system, said order comprising a trading requirement for a customer-specified trading account;
an account manager, coupled said account mapping database, which determines whether there is a correlation between said customer-specified trading account and a provider-approved customer trading account in the set of provider-approved customer trading accounts; and
a trading engine, coupled to said account manager, which books said trading requirement against said provider-approved customer trading account if said correlation exists, and which books said trading requirement against said default customer trading account if said correlation does not exist.

19. The computer system of claim 18, wherein:
said account manager is further configured to supply a notice if said customer-specified trading account is blocked; and
said trading engine will reject said order responsive to said notice.

20. The computer system of claim 18, further comprising a provider interface for communication with a provider trading system.

21. The computer system of claim 20, wherein said account manager may be manipulated by a human operator, via said provider interface, to create a new provider-approved customer trading account corresponding to said customer-specified trading account.

22. A method for processing orders in a computerized asset trading system, comprising:
providing a customer interface for communication with a customer trading system;
providing a provider interface for communication with a provider trading system;
receiving an order from said customer trading system via said customer interface, said order comprising a first trading requirement for an approved customer trading account and a second trading requirement for an unapproved customer trading account;
providing an account mapping subsystem which determines whether there is a first correlation between said approved customer trading account and an approved provider trading account, and a second correlation between said unapproved customer trading account and a default provider trading account; and
providing a trading engine which books said first trading requirement against said approved provider trading account if said first correlation exists, and books said second trading requirement against said default provider trading account if said second correlation exists.

23. The method of claim 22, further comprising rejecting said order if said first correlation and said second correlation do not exist.

24. The method of claim 22, wherein:
said account mapping subsystem is configured to supply a notice if said unapproved customer trading account is blocked; and
said trading engine will reject said order responsive to said notice.

25. The method of claim 22, further comprising storing a detail concerning said order in a trade database.

26. The method of claim 22, further comprising sending a detail concerning said order to said provider trading system via said provider interface.

27. The method of claim 22, further comprising operating said account manager to create a new approved provider trading account corresponding to said unapproved customer trading account.

28. A method for processing orders in a computerized asset trading system, comprising:
defining a set of provider-approved customer trading accounts for a provider trading system;
defining a default customer trading account for said provider trading system;
receiving an order from a customer trading system, said order comprising a trading requirement for a customer-specified trading account;
determining on a processor whether there is a correlation between said customer-specified trading account and a provider-approved customer trading account in the set;
booking said trading requirement against said provider-approved customer trading account if said correlation exists; and
booking said trading requirement against said default customer trading account if said correlation does not exist.

29. The method of claim 28, further comprising creating a new provider-approved customer trading account corresponding to said customer-specified trading account.

30. The method of claim 28, further comprising storing said set of provider-approved customer trading accounts and said default customer trading account in an account mapping database.

31. The method of claim 22, further comprising:
generating a notice if said customer-specified trading account is blocked; and
rejecting said order responsive to said notice.

* * * * *

UNITED STATES PATENT AND TRADEMARK OFFICE
CERTIFICATE OF CORRECTION

PATENT NO. : 7,634,438 B2  Page 1 of 1
APPLICATION NO. : 11/316385
DATED : December 15, 2009
INVENTOR(S) : Neill Penney It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 825 days.

Signed and Sealed this

Ninth Day of November, 2010

David J. Kappos
*Director of the United States Patent and Trademark Office*